(No Model.)

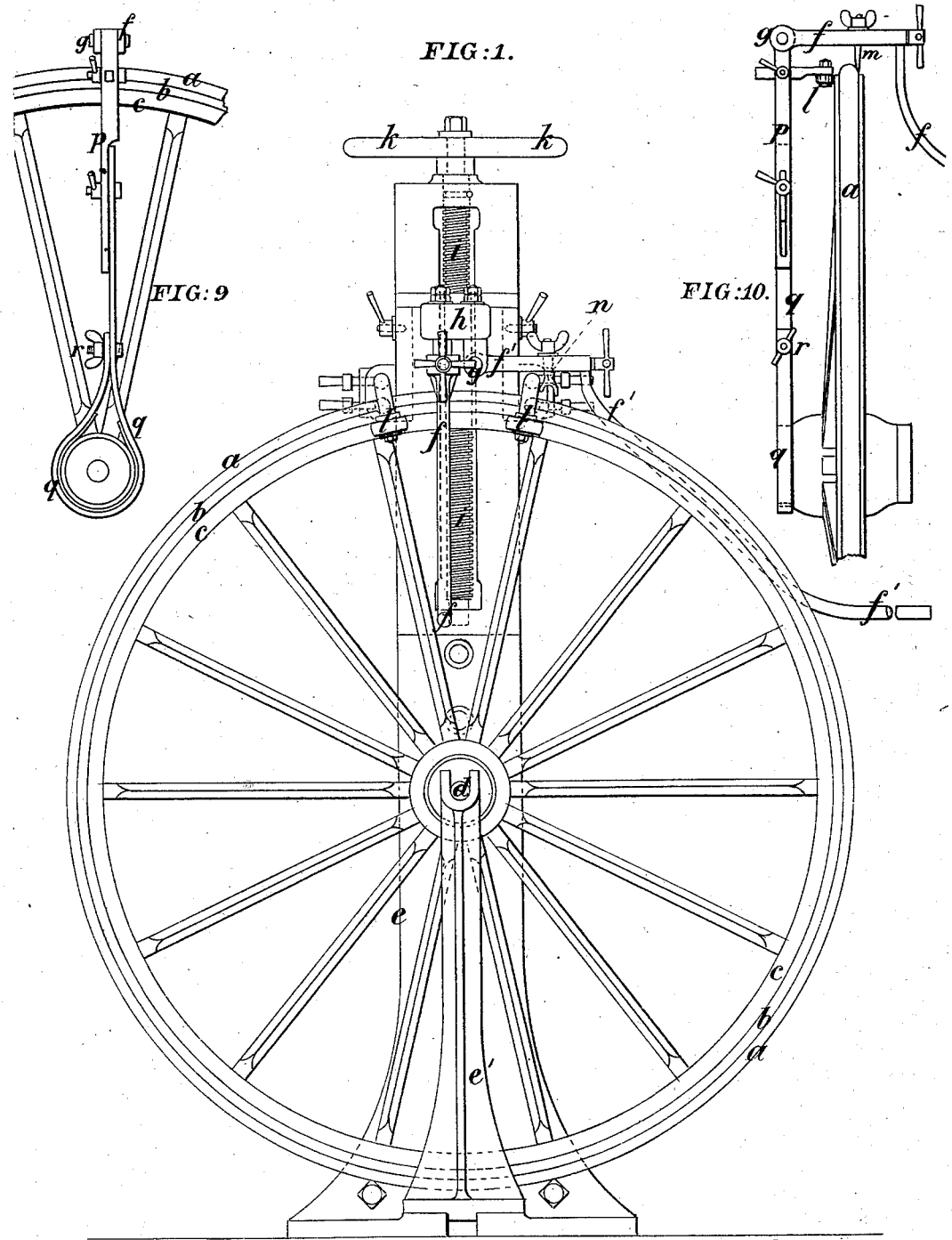

W. H. CARMONT.
DEVICE FOR SETTING INDIA RUBBER TIRES.

No. 315,240. Patented Apr. 7, 1885.

Witnesses
John E. Parker
James F. Tobin

Inventor:
William H. Carmont
by his Attys
Howson & Sons

UNITED STATES PATENT OFFICE.

WILLIAM H. CARMONT, OF MANCHESTER, COUNTY OF LANCASTER, ENGLAND.

DEVICE FOR SETTING INDIA-RUBBER TIRES.

SPECIFICATION forming part of Letters Patent No. 315,240, dated April 7, 1885.

Application filed January 8, 1884. (No model.) Patented in England July 16, 1883, No. 3,484.

*To all whom it may concern:*

Be it known that I, WILLIAM HASSALWOOD CARMONT, a subject of the Queen of Great Britain and Ireland, and residing at Manchester, in the county of Lancaster, England, have invented a machine or apparatus for forcing or compressing india-rubber or other yielding substance into the grooves of metal or other tires or fellies of wheels, of which the following is a specification.

This invention relates to the construction of a machine for forcing or compressing india-rubber or other yielding material into grooved metal or other tires or fellies of a dovetailed or other undercut section in the manufacture of noiseless wheels, the object of the invention being to force into the metal or other groove a band of india-rubber or other yielding material of a larger, and, if necessary, different section, so that the india-rubber or other yielding material shall be considerably compressed and nipped at the sides, in order that it may be held firmly in its place by compression without the necessity for cement or any other kind of fastening.

Figure 2:
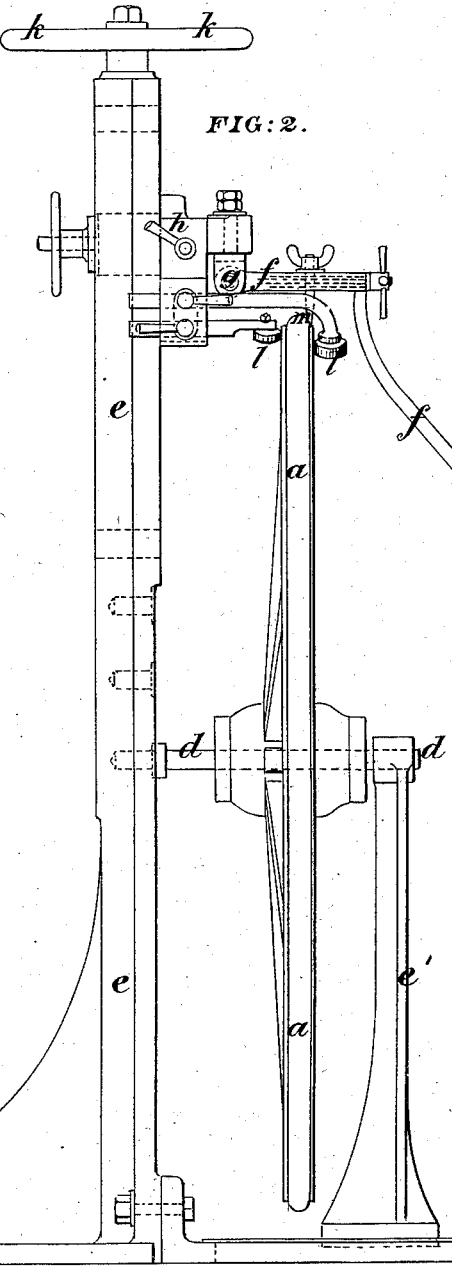

Figure 1 in Sheet 1 of the annexed drawings represents a front view of the machine, and Fig. 2 on Sheet 2 is a side elevation of the same; and Figs. 3, 4, 5, 6, 7, and 8 are detached views, hereinafter referred to, and drawn to a larger scale. Figs. 9 and 10 are views of a modified form of machine, which I term a "hand-machine," more especially adapted for the repair of wheels already in use.

Figure 4:
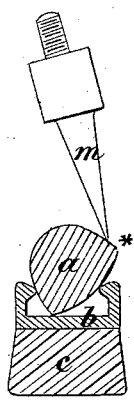

The sections of the india-rubber or other yielding material and metal or other hard substance which I prefer to use are seen clearly at Fig. 4, $a$ being the rubber or other yielding material, and $b\,b$ the undercut grooved metal or other tire of a hard substance. $c\,c$ show in section the wood felly of the wheel. I would, however, here remark that I do not wish to confine myself to any particular sections of rubber or grooved metal tire, as the machine is equally applicable in other cases where it is desirable to force or compress a band or piece of india-rubber or other yielding material into a metal or other groove of a hard substance the mouth of which is narrower than one part of the section of the rubber itself, whether the groove is made of a dovetail or other undercut or bent-in section. The grooved metal tire $b\,b$ having been shrunk and fixed onto a wheel in the ordinary manner, the wheel is mounted on a temporary axle, $d\,d$, which is then fixed in the frame $e\,e'$ of the machine. The main standard $e$ of the frame is provided with holes at different heights, and the machine is provided with movable standards $e'$, of corresponding heights, to accommodate wheels of different diameters. Above the center of the wheel and outside the periphery is mounted a powerful lever, $f\,f$, its fulcrum $g$ being attached to a block, $h\,h$, the height of which is adjustable by means of the screw $i\,i$ and hand-wheel $k\,k$, to suit the diameter of the wheel under operation. On each side of this lever, and on each side of the felly or outer rim of the wheel, is adjusted and fixed firmly a guide-roller, $l\,l$, to hold the felly or outer rim of the wheel in place and prevent the tire or the wheel itself from yielding sidewise to the pressure of the lever $f\,f$. The latter is provided with a tool or instrument, $m\,m$, of suitable form for forcing the rubber or other yielding material into the groove.

Figure 3:
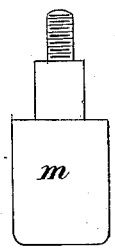

The form of instrument $m\,m$ which I prefer for the first part of the operation is shown in face view (enlarged) at Fig. 3 and edge view at Fig. 4. The india-rubber or other yielding material $a\,a$ is made in a continuous length (or it may, if necessary, be in short pieces) and of a suitable section, (preferably that shown at Fig. 4,) and the workman takes the end and lays it over the groove of the tire or outer rim of the wheel $b\,b$, with its base in a diagonal position, as shown at Fig. 4, one of its lower edges being in the groove resting on the base thereof, and the other edge, $*\,*$, being outside and resting on the edge of the outer side of the grooved metal tire $b\,b$, or outer rim of the wheel, the tool $m\,m$ resting on the edge $*\,*$ of the india-rubber or other yielding material. (See Fig. 4.) The workman now brings down the lever $f\,f$, and with it the tool $m\,m$, and by a downward pressure and a simultaneous side movement he compresses the india-rubber or other yielding material $a\,a$ and forces it into the groove of the metal tire or outer rim of the wheel $b\ b$ (see Fig. 5) until its base fills the undercut portion inside thereof. The rubber or other yielding material is now firmly compressed, and held securely in the groove by the inner projecting edges of the metal tire or wheel-rim, which are deeply indented into the sides of the rubber or other yielding material. Having thus compressed a few inches of the end of the rubber or other yielding material into the groove, the operative withdraws the lever out of the way, and, turning the wheel partly round, proceeds to force in another length of rubber or other yielding material, and so on all round the wheel. The length of rubber or other yielding material is then cut off rather full, and the two ends coming together form a butt-joint.

Figure 5:
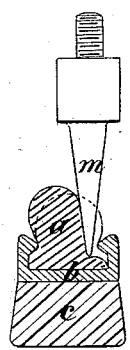
Figure 6:
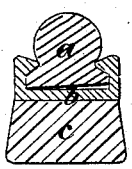
Figure 7:
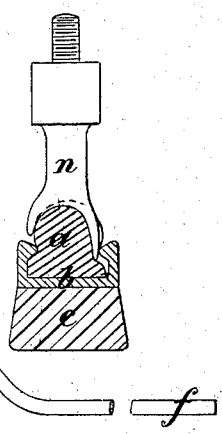

It sometimes occurs that by using only a tool or instrument of the form shown at Figs. 3, 4, and 5 the rubber or other yielding material follows the tool as it is raised and becomes imperfectly bedded, as shown at Fig. 6, and it is then necessary to follow up with a tool or instrument like a clamp, of the form shown at $n\ n$, Fig. 7, which presses the top of the rubber or other yielding material down at the same time that it compresses the sides. For this purpose I make the machine with an additional lever, $f'\ f'$, to carry the tool $n\ n$. It will be observed that either of these levers $f$ or $f'$ can be brought to the front and operated while the other is turned a quarter round out of the way.

Figure 8:
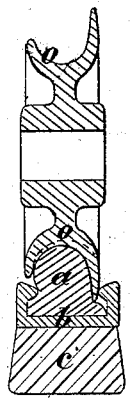

In some cases I prefer to use a rolling tool, as shown at $o\ o$, Fig. 8, instead of the tool $n\ n$, for finishing. In some cases (especially for repairs) I propose to make a hand-tool on the same principle, as shown at Figs. 9 and 10, Sheet 1, by substituting for the axle $d\ d$ and fixed frame $e\ e$ a portable frame, $p\ p$, the lower end, $q\ q$, of which clips the hub of the wheel, and the upper end carries the fulcrum $g$ of the lever $f\ f$. The wheel in this case need not be removed from the axle of the carriage; but the clip $q\ q$ being placed on the hub of the wheel and fixed by the tightening-screw $r$, the lever $f\ f$ is worked in the same way as in the previously-described machine.

I claim as my invention—

1. The herein-described apparatus for applying rubber tires to wheels, said apparatus consisting of a frame adapted to receive or to be applied to the wheel, and a lever pivoted to the frame and carrying a tool to force the tire into the groove of the wheel, substantially as set forth.

2. The combination of the fixed frame, having bearings for the wheel, with a block adjustable in said frame, and having pivoted thereto a lever carrying a tool to force the rubber tire into the groove of the wheel, substantially as set forth.

3. The combination of a frame consisting of a fixed standard having holes and detachable standards of different heights with an adjustable block on said standard, and a lever pivoted to the block and carrying a tool to force the tire into the groove of the wheel, substantially as described.

4. The combination of the frame for the wheel with a lever pivoted to the frame and carrying a tool to force the tire into the groove of the wheel, and a guide-roller, $i$, on the frame, substantially as specified.

5. The herein-described apparatus for applying rubber tires to wheels, the said apparatus consisting of the frame for the wheel, an adjustable block, $h$, thereon, and two pivoted levers carrying tools, one of a knife form and the other of a clamp form, substantially as set forth.

In testimony whereof I have signed my name to this specification in the presence of two subscribing witnesses.

W. H. CARMONT.

Witnesses:
JOHN HUGHES,
CHARLES DAVIES.